(12) United States Patent
Wu (10) Patent No.: US 10,234,643 B2
(45) Date of Patent: Mar. 19, 2019

(54) OPTICAL CONNECTOR

(71) Applicant: CENTERA Photonics Inc., Hsinchu (TW)

(72) Inventor: Hsin-Chieh Wu, Taoyuan (TW)

(73) Assignee: CENTERA Photonics Inc., Hsinchu (TW)

( * ) Notice: Subject to any disclaimer, the term of this patent is extended or adjusted under 35 U.S.C. 154(b) by 167 days.

(21) Appl. No.: 15/435,313

(22) Filed: Feb. 17, 2017

(65) Prior Publication Data

US 2017/0254970 A1 Sep. 7, 2017

(30) Foreign Application Priority Data

Mar. 3, 2016 (TW) .............................. 105106505 A (51) Int. Cl.
*H01J 40/14* (2006.01)
*G02B 6/42* (2006.01)
*G02B 6/32* (2006.01)

(52) U.S. Cl.
CPC ............. *G02B 6/4214* (2013.01); *G02B 6/32* (2013.01); *G02B 6/425* (2013.01); *G02B 6/4206* (2013.01); *G02B 6/4228* (2013.01); *G02B 6/4243* (2013.01); *G02B 6/4257* (2013.01)

(58) Field of Classification Search
CPC .... G02B 6/4204; G02B 6/4214; G02B 6/425; G02B 6/4257
USPC ..................... 250/227.11, 227.24; 385/27, 88
See application file for complete search history.

(56) References Cited

U.S. PATENT DOCUMENTS 4,906,837 A * 3/1990 Doneen .............. G01D 5/34723
 250/227.29
7,925,130 B2 * 4/2011 Fujii ..................... G02B 6/4214
 385/14

* cited by examiner

*Primary Examiner* — Kevin K Pyo
(74) *Attorney, Agent, or Firm* — CKC & Partners Co., LLC (57) ABSTRACT

An optical connector includes a substrate, plural optical channels for transmitting an optical signal, a light source, an oblique structure, and a photo detector. The light source is located on the substrate to emit a first optical signal. The oblique structure has an optical reflective surface to reflect the first optical signal emitted by the light source to at least one of the optical channels. The photo detector is located on the substrate to receive a second optical signal emitted by at least one of the optical channels. The optical reflective surface has at least one gap, such that the optical reflective surface is divided into at least two segments by the gap, and the segments are not electrically connected with each other.

19 Claims, 12 Drawing Sheets

OPTICAL CONNECTOR

RELATED APPLICATIONS

This application claims priority to Taiwan Application Serial Number 105106505, Mar. 3, 2016, which is herein incorporated by reference.

BACKGROUND

Field of Invention

The present invention relates to an optical connector.

Description of Related Art

In general, an optical connector may include a light source and an optical fiber. In one type of the optical connector, the light source may be aligned with an end surface of the optical fiber. As a result of such a design, when the light source emits light, the light-emitting direction of the light source is the same as the light transmission direction of the optical fiber, and the light emitted by the light source and the light transmitted in the optical fiber are coaxial light. Moreover, in another type of the optical connector, an optical reflective surface is arranged in the optical connector, and the light source is under the optical reflective surface. As a result of such a design, when the light source emits light, the light may be reflected by the optical reflective surface to enter the optical fiber. The light-emitting direction of the light source is perpendicular to the light transmission direction of the optical fiber. In other words, the two optical axes of the light source and the optical fiber are perpendicular.

However, utilizing high frequency is a trend in the development of optical transmission, and crosstalk formed by plural channels of an optical transmission system is prone to occur. In addition, a typical optical connector has a large number of components that are complicated to assemble, and there may be difficulty in manufacturing, thereby increasing the difficulty of packaging and optically coupling the optical connector. As a result, it is unfavorable for production.

SUMMARY

An aspect of the present invention is to provide an optical connector.

According to an embodiment of the present invention, an optical connector includes a substrate, a plurality of optical channels, a light source, an oblique structure, and a photo detector. The optical channels transmit optical signals. The light source is located on the substrate to emit a first optical signal. The oblique structure has an optical reflective surface to reflect the first optical signal that is emitted by the light source to at least one of the optical channels. The photo detector is located on the substrate to receive a second optical signal that is emitted by at least one of the optical channels. The optical reflective surface has at least one gap, such that the optical reflective surface is divided into at least two segments by the gap, and the segments are not electrically connected with each other.

In the aforementioned embodiment of the present invention, since the optical reflective surface of the optical connector is divided into at least two segments by the gap, one of the segments of the optical reflective surface may reflect the first optical signal of the light source to a portion of the optical channels and another one of the segments of the optical reflective surface may reflect the second optical signal of another portion of the optical channels to the photo detector. As a result, when the light source emits light, the segment of the optical reflective surface used to reflect the first optical signal of the light source does not transmit electromagnetic noise to the segment of the optical reflective surface used to reflect the second optical signal of the optical channel, and the segment of the optical reflective surface used to reflect the second optical signal of the optical channel does not transmit electromagnetic noise to the segment of the optical reflective surface used to reflect the first optical signal of the light source, either. The optical connector of the present invention is capable of having low electromagnetic crosstalk and low noise interference.

Another aspect of the present invention is to provide an optical connector.

According to an embodiment of the present invention, an optical connector includes a substrate, an oblique structure, at least one noise-absorbing film, a plurality of optical channels, a light source, and a photo detector. The oblique structure has an optical reflective surface. The noise-absorbing film is located on the optical reflective surface. The optical channels are disposed on the substrate. The light source is located on the substrate to emit a first optical signal. The first optical signal is reflected by the optical reflective surface to enter at least one of the optical channels. The photo detector is located on the substrate to receive a second optical signal. The second optical signal is emitted by at least one of the optical channels and is reflected by the optical reflective surface.

In the aforementioned embodiment of the present invention, the noise-absorbing film of the optical connector is located on the optical reflective surface. Hence, when the light source emits light, the noise-absorbing film can not only absorb the noise of the light source optically coupled to the optical reflective surface but also absorb the noise of the optical reflective surface optically coupled to the photo detector. The optical connector of the present invention is capable of having low electromagnetic crosstalk and low noise interference.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
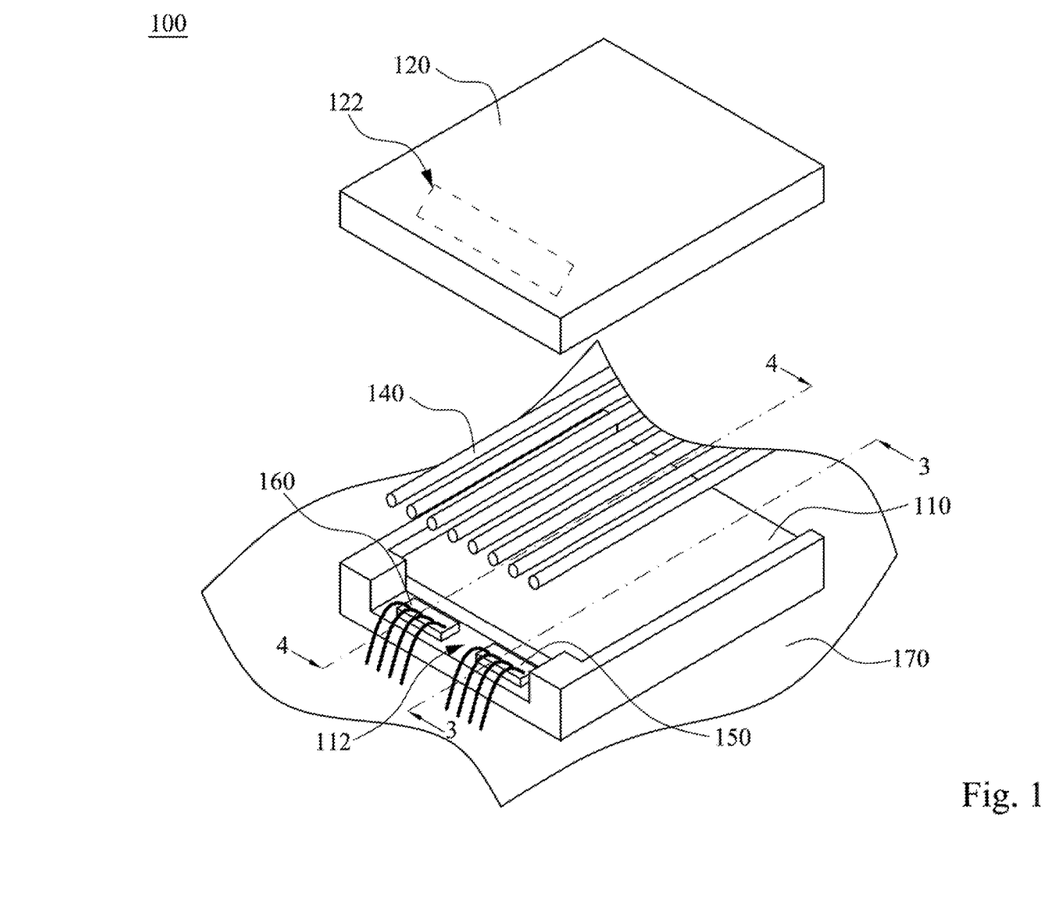
FIG. 1 is an exploded view of an optical connector according to one embodiment of the present invention.
Figure 2:
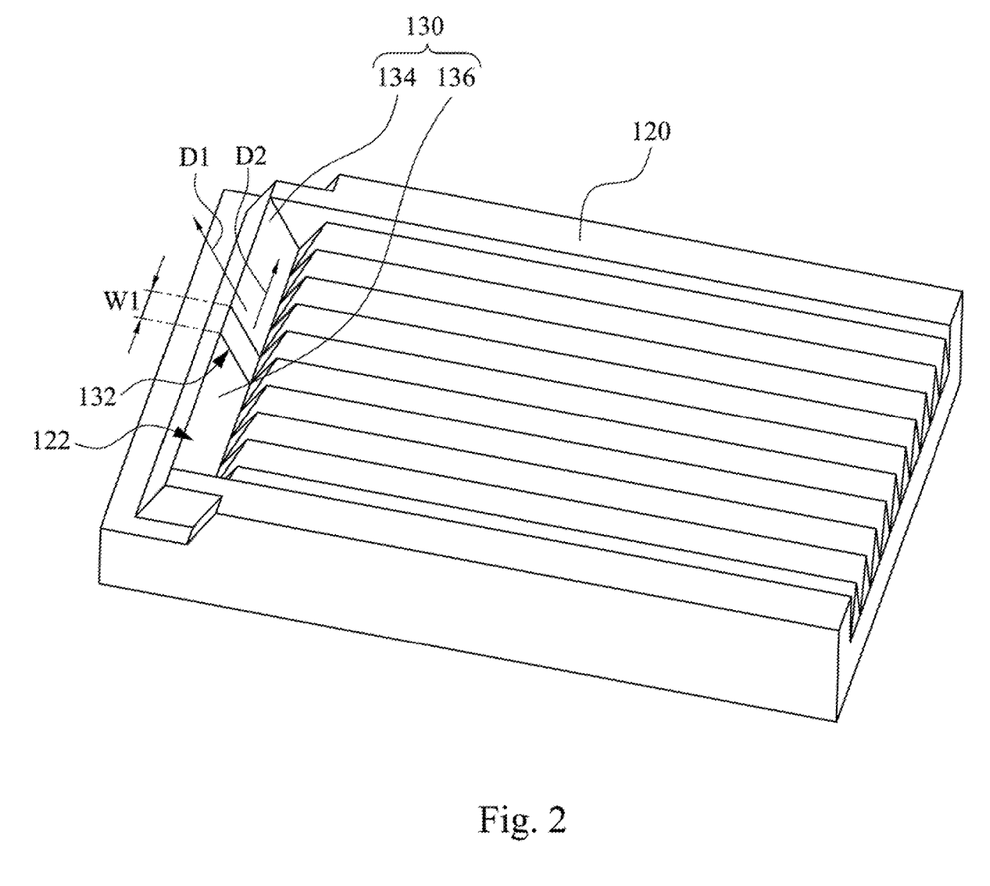
FIG. 2 is a perspective view of a cover shown in FIG. 1 after being flipped over.

FIG. 1 is an exploded view of an optical connector 100 according to one embodiment of the present invention. FIG. 2 is a perspective view of a cover 120 shown in FIG. 1 after being flipped over. As shown in FIG. 1 and FIG. 2, the optical connector 100 includes a substrate 110, the cover 120, an oblique structure 122, plural optical channels 140, a light source 150, and a photo detector 160 (PD). The light source 150 may be a component capable of converting electricity into light, or may be a component capable of converting light into light. The photo detector 160 may be a component capable of converting light into electricity, or may be a component capable of converting light into light. The optical channels 140 may transmit optical signals. In this embodiment, the oblique structure 122 is located in the cover 120, and the optical channels 140 are disposed on the cover 120. The oblique structure 122 has an optical reflective surface 130. Moreover, the optical reflective surface 130 has at least one gap 132, such that the optical reflective surface 130 is divided into at least two segments 134, 136 by the gap 132. The optical channels 140 are between the substrate 110 and the cover 120. The light source 150 and the photo detector 160 are located on the substrate 110, and are located on the same edge 112 of the substrate 110.

Figure 3A:
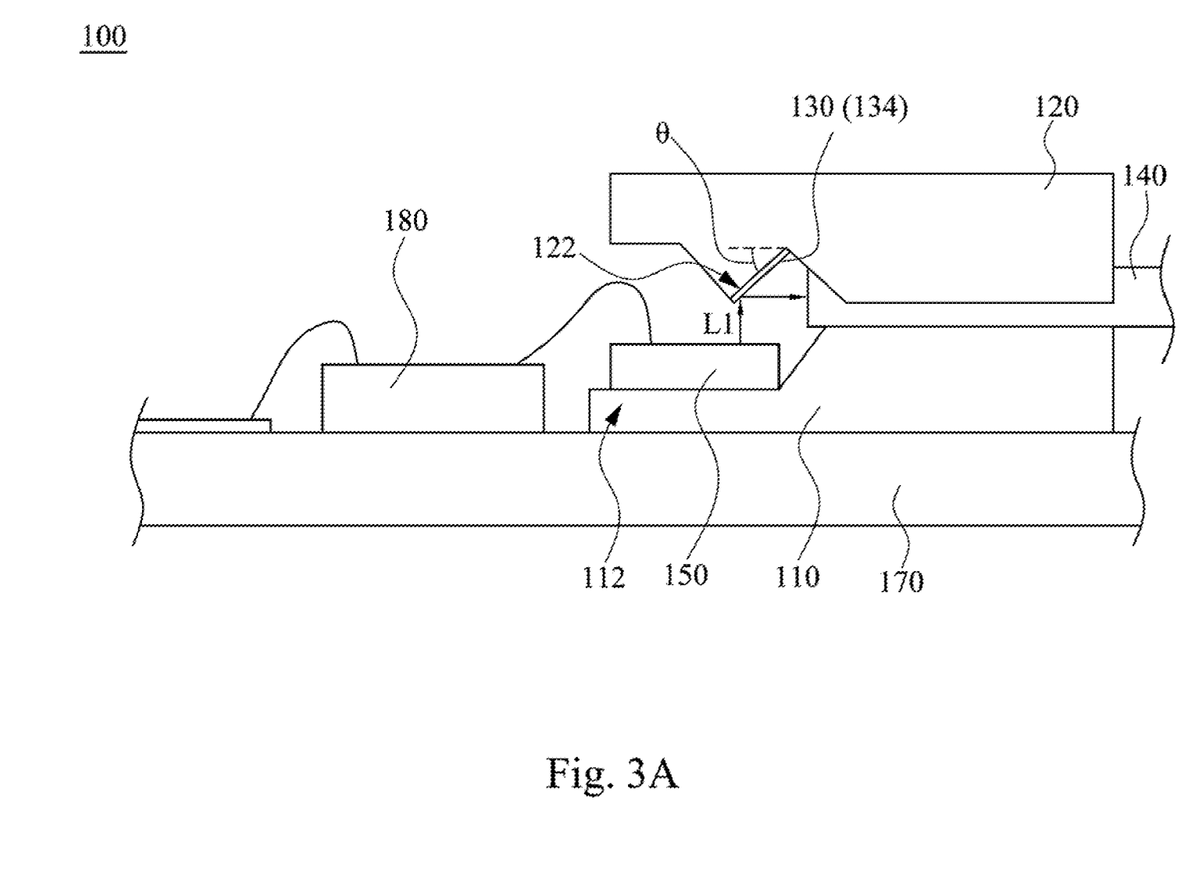
FIG. 3A is a cross-sectional view of the optical connector taken along line 3-3 shown in FIG. 1 after being assembled.

FIG. 3A is a cross-sectional view of the optical connector 100 taken along line 3-3 shown in FIG. 1 after being assembled. As shown in FIG. 2 and FIG. 3A, after the cover 120 is assembled to the substrate 110, the segment 134 of the optical reflective surface 130 is above the light source 150. In other words, the orthogonal projection of the segment 134 of the optical reflective surface 130 on the substrate 110 overlaps at least a portion of the orthogonal projection of the light source 150 on the substrate 110. When the light source 150 emits light, the segment 134 of the optical reflective surface 130 may reflect a first optical signal L1 that is emitted by the light source 150 to a portion of the optical channels 140. Since the optical reflective surface 130 of the optical connector 100 is divided into the segments 134, 136 by the gap 132, the segment 134 of the optical reflective surface 130 used to reflect the first optical signal L1 of the light source 150 does not transmit electromagnetic noise to the segment 136. In one embodiment of the present invention, the optical reflective surface 130 is a film that is made of a material including metal. The film may be a metal alloy layer, a multi-layer structure, or a non-conductive sheet that has plural conductive particles distributed therein. The segments of the film formed by the gap 132 are not electrically connected with each other. Therefore, such configuration may ensure signals and electromagnetic noise that are reflected by different segments are not mutually interfered with.

An end of the optical channel 140 shown in FIG. 3A faces the segment 134 of the optical reflective surface 130, and is optically coupled to the light source 150; another end of the optical channel 140 extends to another optical connector, and is optically coupled to a photo detector of that optical connector. In one embodiment of the present invention, the optical channels 140 may be optical fibers. An end surface of the optical channel 140 facing the optical reflective surface 130 may be perpendicular to an optical path (e.g., FIG. 3A), or the end surface of the optical channel 140 may be an oblique surface (not shown). In another embodiment of the present invention, the optical channel 140 may be a lens structure to enable light to focus and be transmitted to other light transmission components, such as fibers, optical waveguides, etc.

In this embodiment, the lengthwise direction D1 of the gap 132 is perpendicular to the lengthwise direction D2 of the optical reflective surface 130. The width W1 of the gap 132 is greater than or equal to 50 μm, and such arrangement ensures that electromagnetic noise is not be transmitted between the segments 134, 136 to cause interference. In addition, the substrate 110 and the cover 120 may be made of a material including silicon, semiconductor, or ceramic, which may be formed by photolithography. For example, the cover 120 may form the oblique surface of the oblique structure 122 through an etching process, and an included angle θ in a range from 35 degrees to 55 degrees may be formed between the oblique surface of the oblique structure 122 and a horizontal plane, such as 45 degrees. In one embodiment of the present invention, each of the substrate 110 and the cover 120 has an alignment portion (not shown), thereby facilitating the combination of the substrate 110 and the cover 120. As a result, the assembly time of the optical connector 100 can be reduced and the precision of machining may be improved, which are helpful to production.

The light source 150 may be a vertical cavity surface emitting laser (VCSEL). The optical reflective surface 130 may be made of a material including gold, but the present invention is not limited in this regard. In this embodiment, the optical reflective surface 130 may be a film that is formed on the oblique surface of the oblique structure 122 and is made of a material including metal. In another embodiment, the oblique structure 122 may be made of a material including metal, and the oblique surface of the oblique structure 122 may be directly used as the optical reflective surface without forming additional film that is made of a material including metal.

Figure 3B:
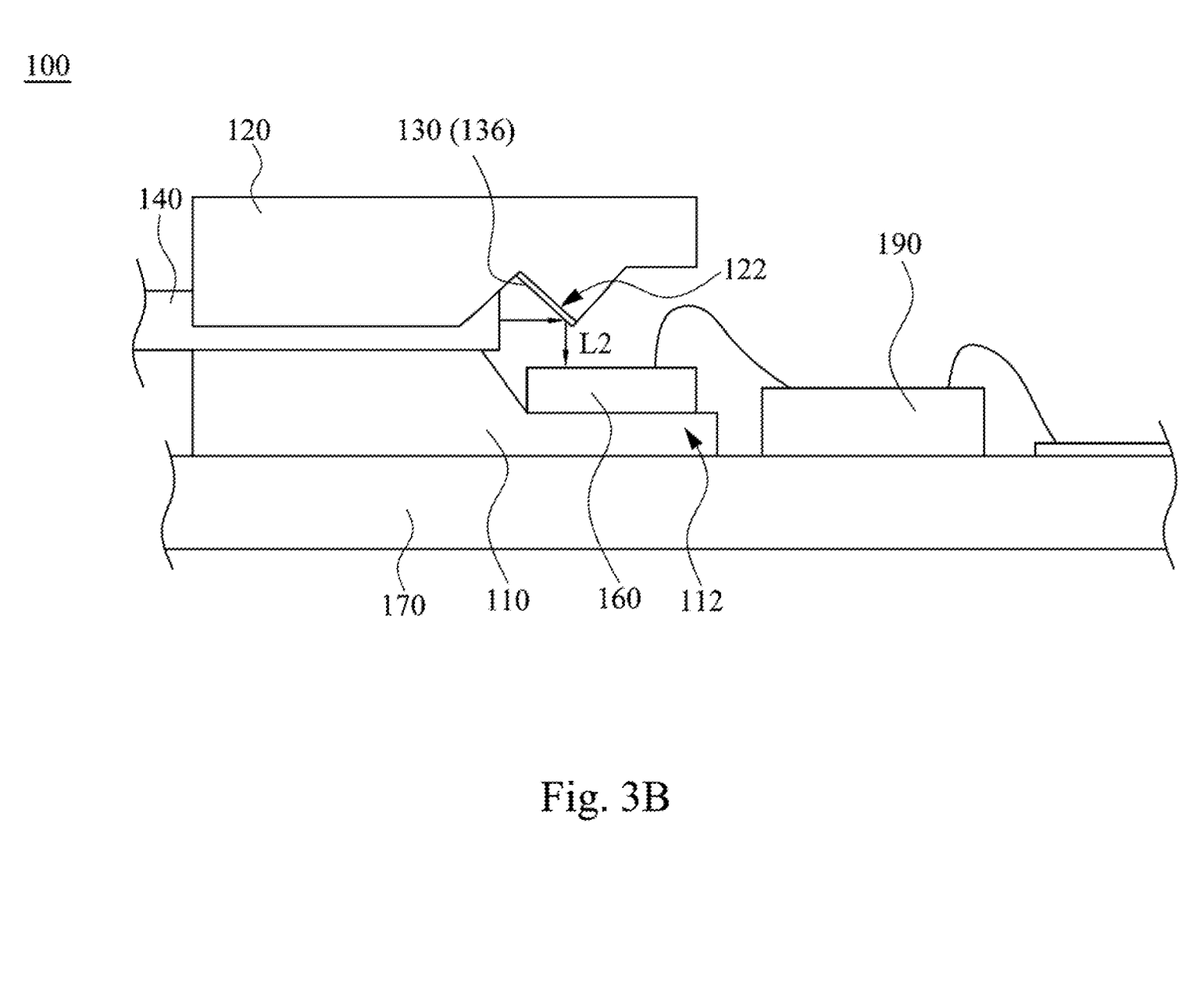
FIG. 3B is a cross-sectional view of the optical connector taken along line 4-4 shown in FIG. 1 after being assembled.

FIG. 3B is a cross-sectional view of the optical connector 100 taken along line 4-4 shown in FIG. 1 after being assembled. As shown in FIG. 2 and FIG. 3B, after the cover 120 is assembled to the substrate 110, the segment 136 of the optical reflective surface 130 is above the photo detector 160. In other words, the orthogonal projection of the segment 136 of the optical reflective surface 130 on the substrate 110 overlaps at least a portion of the orthogonal projection of the photo detector 160 on the substrate 110. The segment 136 of the optical reflective surface 130 may reflect a second signal L2 of another portion of the optical channels 140 to the photo detector 160. In other words, the photo detector 160 may receive the second optical signal L2 that is emitted by the optical channel 140.

An end of the optical channel 140 shown in FIG. 3B faces the segment 136 of the optical reflective surface 130, and is optically coupled to the photo detector 160; another end of the optical channel 140 extends to another optical connector, and is optically coupled to a light source of that optical connector.

In one embodiment of the present invention, an end surface of the optical channel 140 facing the optical reflective surface 130 may be perpendicular to an optical path (e.g., FIG. 3B), or the end surface of the optical channel 140 may be an oblique surface (not shown).

As shown in FIG. 3A and FIG. 3B, the optical reflective surface 130 of the optical connector 100 is divided into at least two segments 134, 136 by the gap 132, and the orthogonal projection of the segment 134 of the optical reflective surface 130 on the substrate 110 overlaps at least a portion of the orthogonal projection of the light source 150 on the substrate 110, and the orthogonal projection of the segment 136 of the optical reflective surface 130 on the substrate 110 overlaps at least a portion of the orthogonal projection of the photo detector 160 on the substrate 110. Hence, the segment 134 of the optical reflective surface 130 used to reflect the first optical signal L1 of the light source 150 does not transmit electromagnetic noise to the segment 136 of the optical reflective surface 130 used to reflect the second optical signal L2 of the optical channel 140, and the segment 136 of the optical reflective surface 130 used to reflect the second optical signal L2 of the optical channel 140 does not transmit electromagnetic noise to the segment 134 of the optical reflective surface 130 used to reflect the first optical signal L1 of the light source 150, either. As a result, the optical connector 100 of the present invention is capable of having low electromagnetic crosstalk and low noise interference.

The optical connector 100 may further include a printed circuit board 170, a driver 180, and a transimpedance amplifier 190 (TIA). An input electrical signal or an input optical signal may be treated and then be transmitted to the light source 150 through the driver 180, such that the light source 150 emits light that has the signal. The transimpedance amplifier 190 may receive the optical signal or the electrical signal of the photo detector 160, and then the signal is treated to be output through the transimpedance amplifier 190. The printed circuit board 170 bears the substrate 110. The printed circuit board 170 may be made of a material including silicon, semiconductor, ceramic, epoxy, or plastic, but the present invention is not limited in this regard. The driver 180 is located on the printed circuit board 170 and is electrically connected to the light source 150. The transimpedance amplifier 170 is located on the printed circuit board 170 and is electrically connected to the photo detector 160. In one embodiment of the present invention, the driver 180 may be disposed on the substrate 110. In one embodiment of the present invention, an electrical connection between the driver 180 and the light source 150 and an electrical connection between the transimpedance amplifier 190 and the photo detector 160 may be formed by wire bonding, as shown in FIG. 3A and FIG. 3B. Alternatively, the aforesaid connections also may be formed by flip ship through the through silicon via of the substrate 110.

Figure 4A:
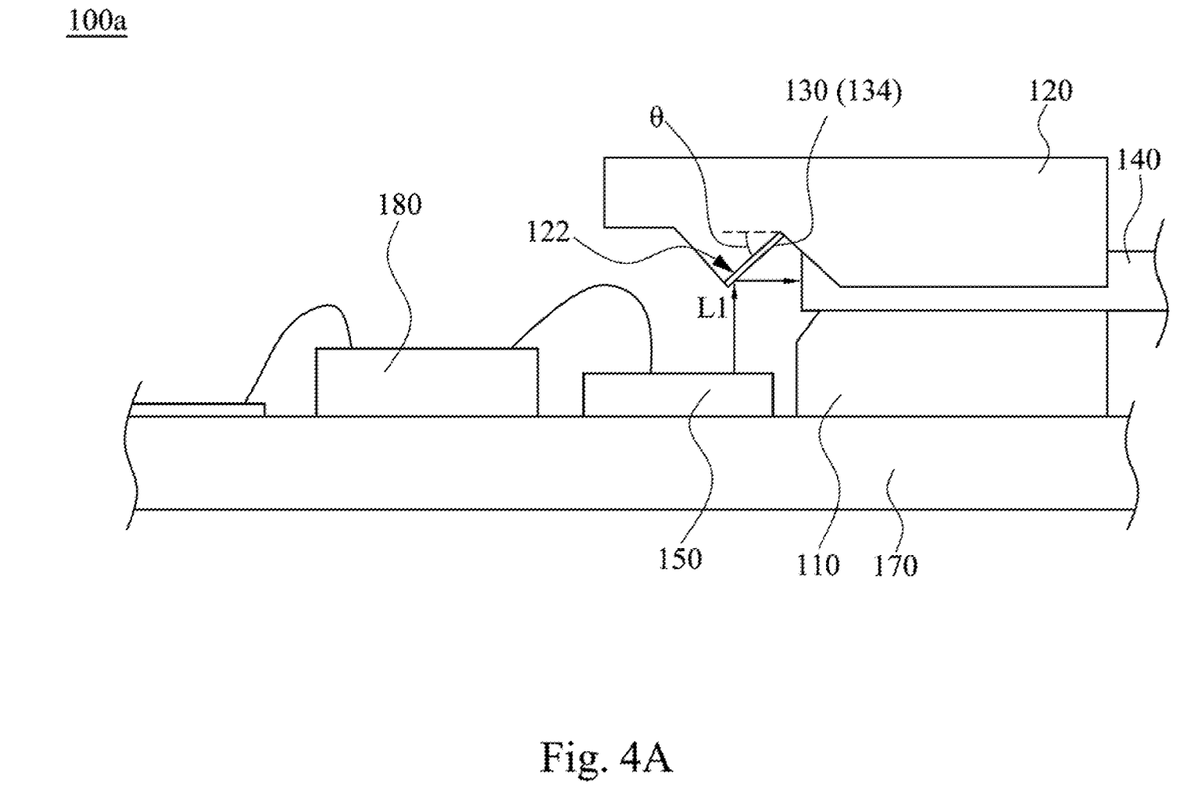
FIG. 4A is a cross-sectional view of an optical connector adjacent to a light source according to one embodiment of the present invention.
Figure 4B:
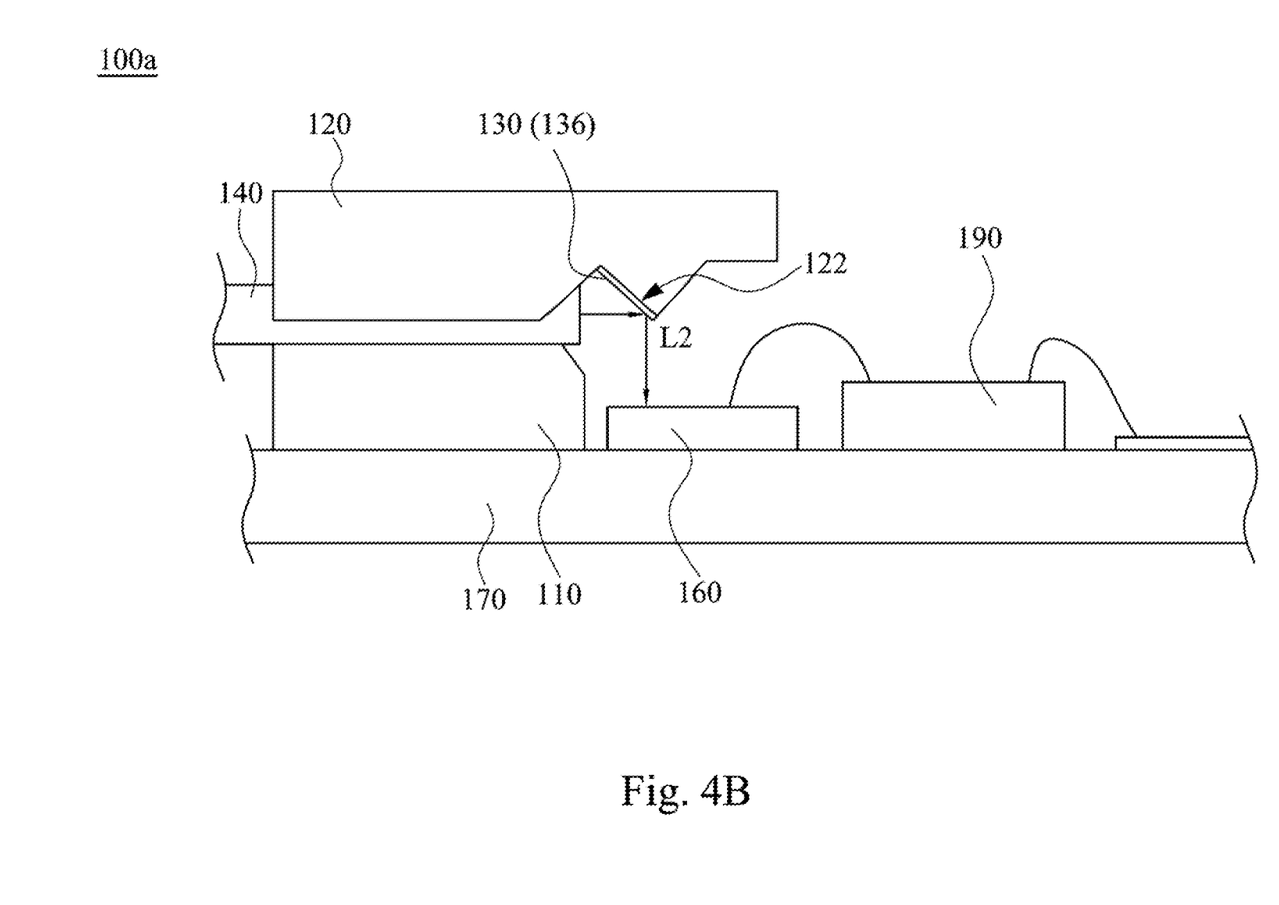
FIG. 4B is a cross-sectional view of the optical connector adjacent to a photo detector shown in FIG. 4A.

FIG. 4A is a cross-sectional view of an optical connector 100a adjacent to the light source 150 according to one embodiment of the present invention. FIG. 4B is a cross-sectional view of the optical connector 100a adjacent to the photo detector 160 shown in FIG. 4A. The optical connector 100a includes the substrate 110, the cover 120, the oblique structure 122, the optical channels 140, the light source 150, and the photo detector 160. The difference between this embodiment and the embodiment shown in FIGS. 3A and 3B is that the light source 150 and the photo detector 160 of the optical connector 100a are not disposed on the substrate 110, but are disposed on the printed circuit board 170. As a result of such a design, the optical reflective surface 130 of the oblique structure 122 may reflect the first optical signal L1 that is emitted by the light source 150 into the optical channel 140, and the photo detector 160 may receive the second optical signal L2 that is emitted by the optical channel 140 and is reflected by the optical reflective surface 130.

Figure 5A:
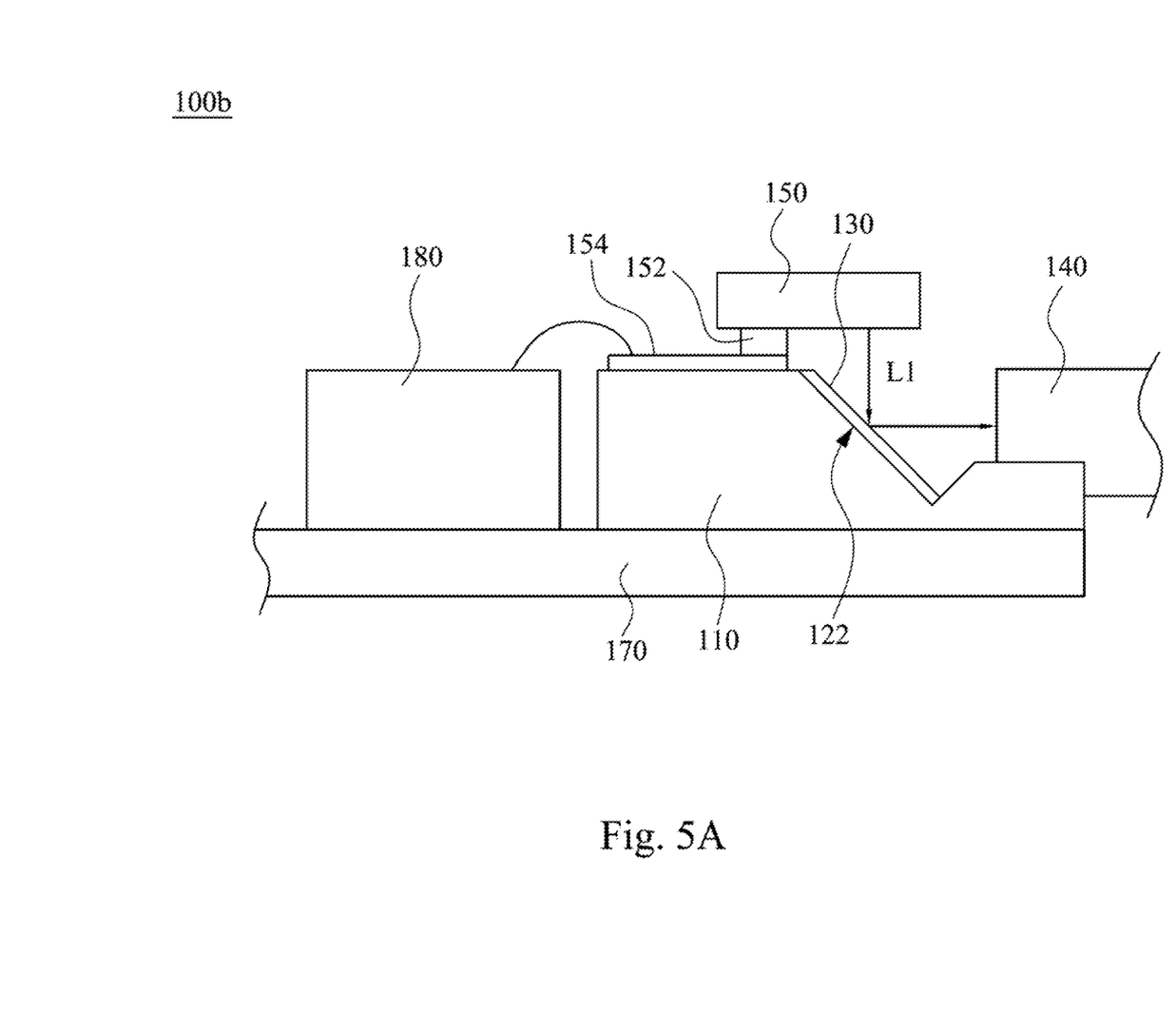
FIG. 5A is a cross-sectional view of an optical connector adjacent to a light source according to one embodiment of the present invention.
Figure 5B:
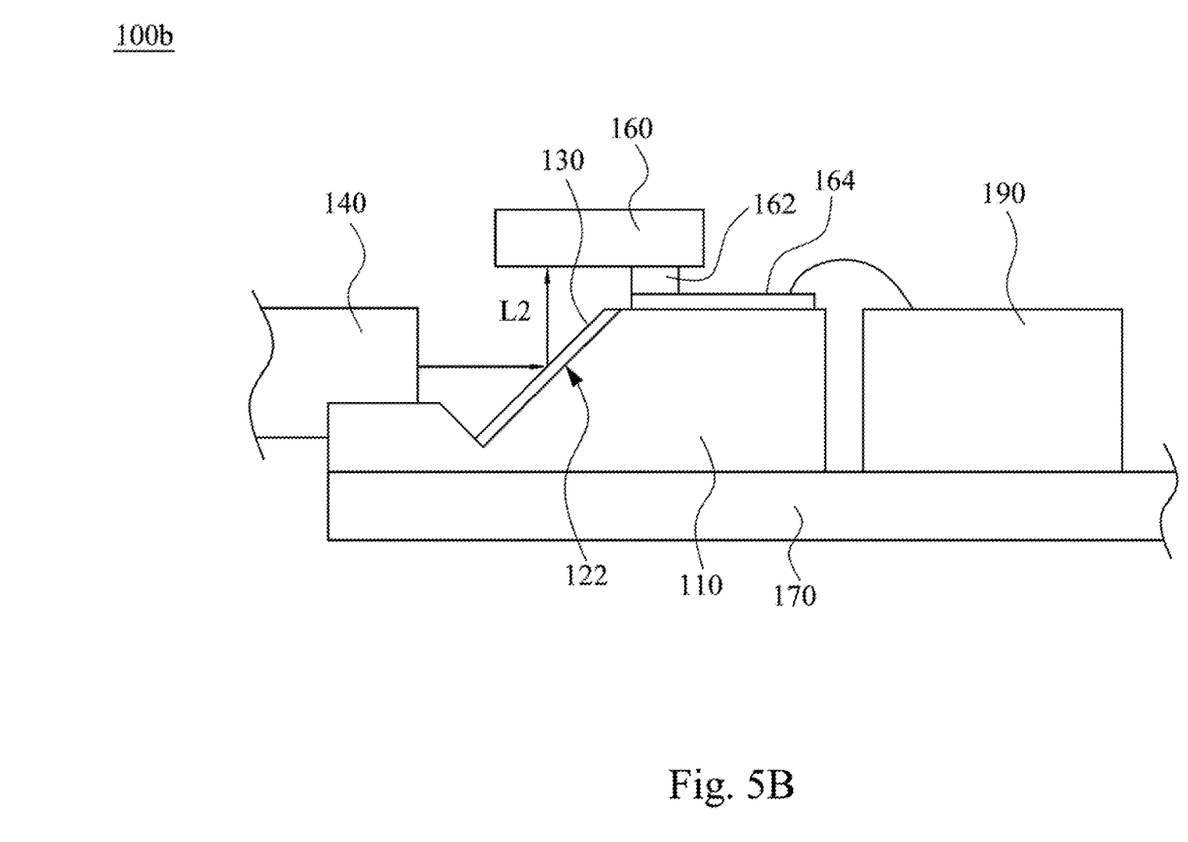
FIG. 5B is a cross-sectional view of the optical connector adjacent to a photo detector shown in FIG. 5A.

FIG. 5A is a cross-sectional view of an optical connector 100b adjacent to the light source 150 according to one embodiment of the present invention. FIG. 5B is a cross-sectional view of the optical connector 100b adjacent to the photo detector 160 shown in FIG. 5A. The optical connector 100b includes the substrate 110, the oblique structure 122, the optical channels 140, the light source 150, and the photo detector 160. The difference between this embodiment and the embodiment shown in FIGS. 3A and 3B is that the optical connector 100b has no cover 120, and the oblique structure 122 of the optical connector 100b is located on the substrate 110, and the optical channels 140 is disposed on the substrate 110. In this embodiment, the substrate 110 may be a printed circuit board or a substrate that is supported by a printed circuit board. The substrate 110 may be made of a material including plastic, silicon, semiconductor, ceramic, or epoxy. Furthermore, the light source 150 of the optical connector 100b may be electrically connected to the driver 180 through a conductive bump 152, a conductive line 154, and wire bonding. The photo detector 160 may be electrically connected to the transimpedance amplifier 190 through a conductive bump 162, a conductive line 164, and wire bonding. When the optical connector 100b is used, the optical reflective surface 130 of the oblique structure 122 may reflect the first optical signal L1 that is emitted by the light source 150 into the optical channel 140, and the photo detector 160 may receive the second optical signal L2 that is emitted by the optical channel 140 and is reflected by the optical reflective surface 130.

It is to be noted that the connection relationships and materials of the elements described above will not be repeated in the following description, and only aspects related to other types of the optical reflective surface 130 will be described.

Figure 6:
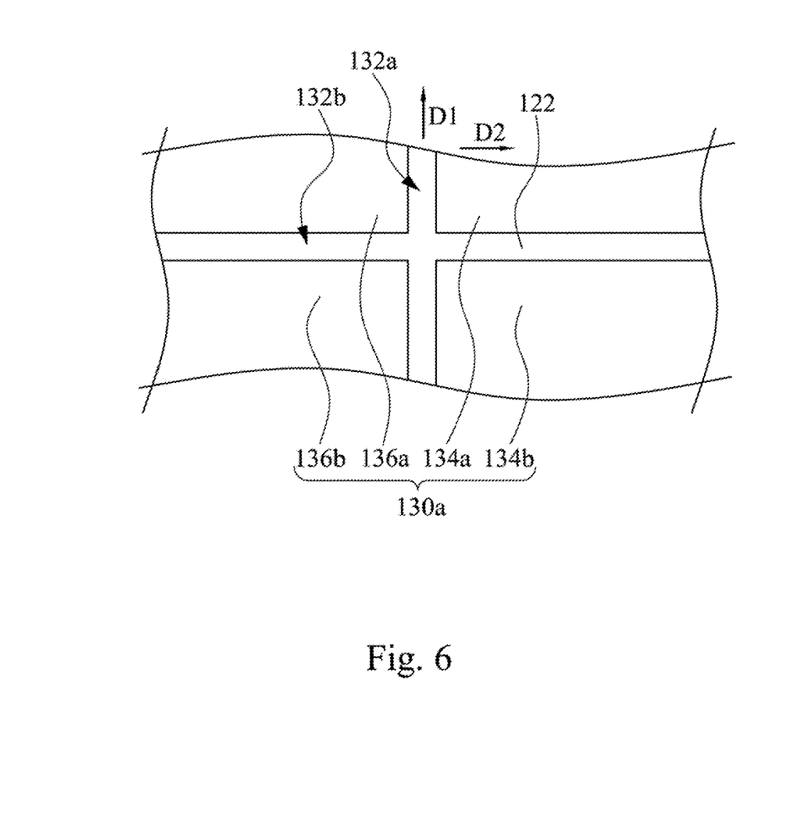
FIG. 6 is a partially enlarged view of an optical reflective surface according to one embodiment of the present invention.

FIG. 6 is a partially enlarged view of an optical reflective surface 130a according to one embodiment of the present invention. The difference between this embodiment and the embodiment shown in FIG. 2 is that the optical reflective surface 130a has a plurality of gaps 132a, 132b that intersect with each other. In this embodiment, the lengthwise direction D1 of the gap 132a is perpendicular to the lengthwise direction D2 of the optical reflective surface 130a, and the lengthwise direction D2 of the gap 132b is parallel to the lengthwise direction D2 of the optical reflective surface 130a. As a result, the optical reflective surface 130a may be divided into four segments 134a, 134b, 136a, 136b by the gaps 132a, 132b. The optical reflective surface 130 shown in FIGS. 2 to 5B may be replaced with the optical reflective surface 130a as deemed necessary by designers.

Figure 7:
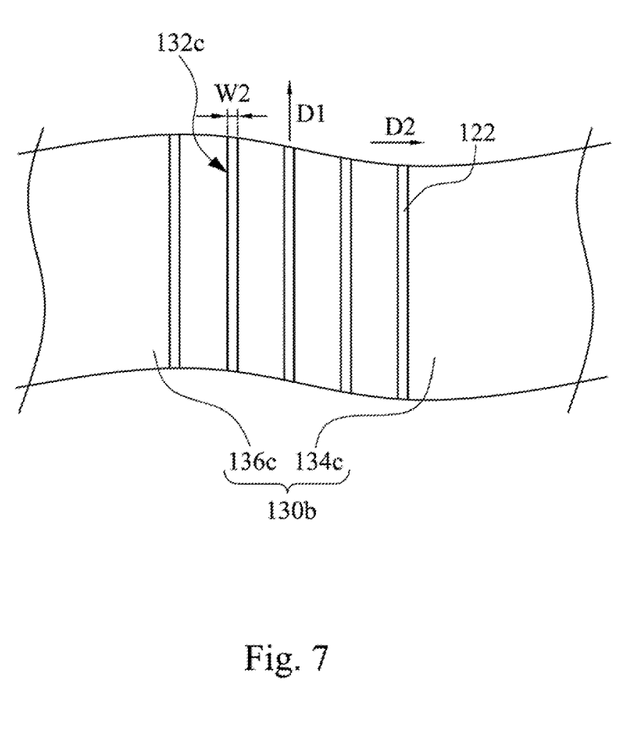
FIG. 7 is a partially enlarged view of an optical reflective surface according to one embodiment of the present invention.

FIG. 7 is a partially enlarged view of an optical reflective surface 130b according to one embodiment of the present invention. The difference between this embodiment and the embodiment shown in FIG. 2 is that the optical reflective surface 130b has a plurality of gaps 132c, and the sum of the widths W2 of the gaps 132c is greater than or equal to 50 µm. Such configuration may ensure that the electromagnetic noise is not be transmitted between the segments 134c, 136c to cause interference. In one embodiment of the present invention, each of the segments formed by diving the optical reflective surface 130b through the gaps 132c may correspond one of the optical channels 140 in position, such that signals transmitted by the optical channels 140 are not mutually interfered. The optical reflective surface 130 shown in FIGS. 2 to 5B may be replaced with the optical reflective surface 130b as deemed necessary by designers.

Figure 8:
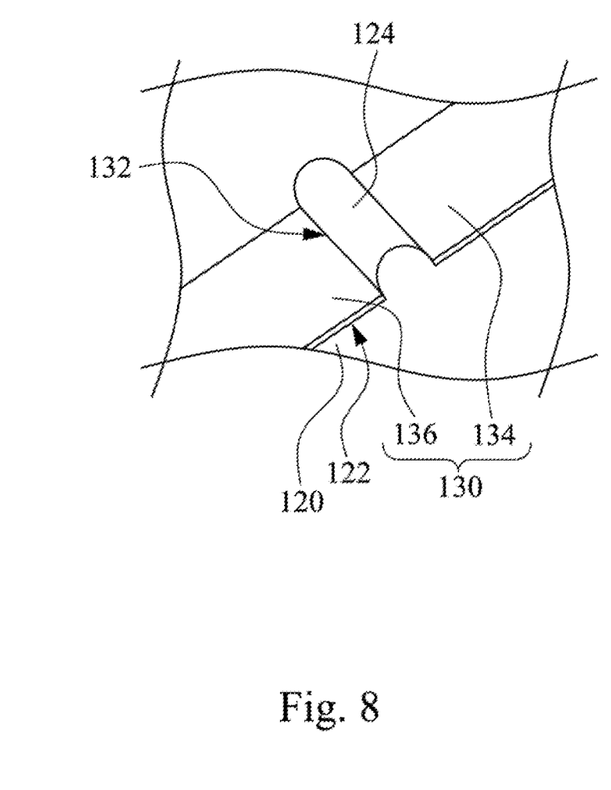
FIG. 8 is a partially enlarged view of an oblique surface and an optical reflective surface of a cover according to one embodiment of the present invention.

FIG. 8 is a partially enlarged view of the oblique surface and the optical reflective surface 130 of the oblique structure 122 according to one embodiment of the present invention. The difference between this embodiment and the embodiment shown in FIG. 2 is that the oblique surface of the oblique structure 122 may further have at least one protruding rib 124 that protrudes from the gap 132 of the optical reflective surface 130. In other words, the protruding rib 124 corresponds to the gap 132 in position. The material of the optical reflective surface 130 may be formed on the surface of the protruding rib 124, or may be not formed on the surface of the protruding rib 124. The protruding rib 124 may be used on the oblique structure 122 shown in FIGS. 2 to 5B.

Figure 9:
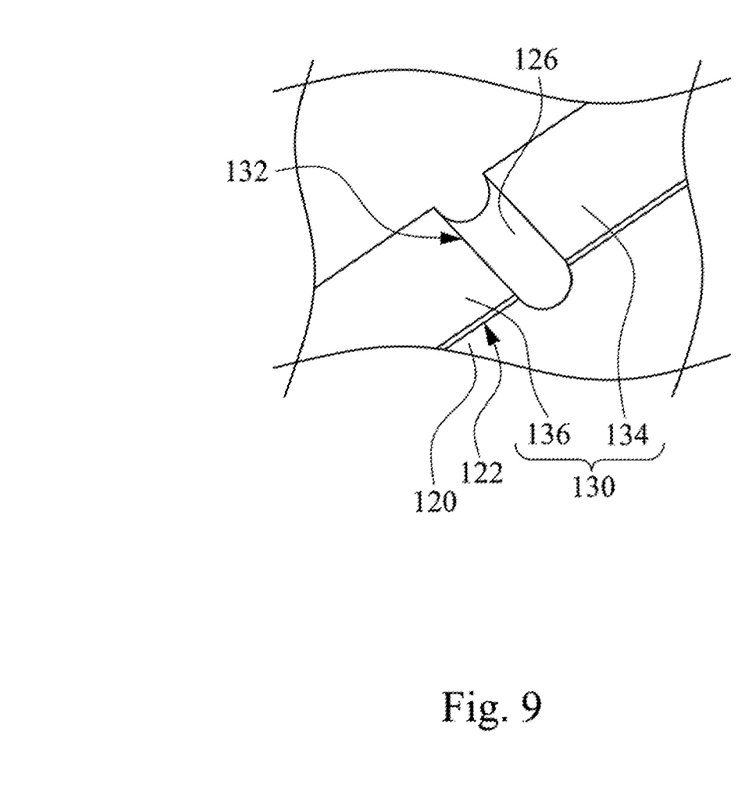
FIG. 9 is a partially enlarged view of an oblique surface and an optical reflective surface of a cover according to one embodiment of the present invention.

FIG. 9 is a partially enlarged view of the oblique surface and the optical reflective surface 130 of the oblique structure 122 according to one embodiment of the present invention. The difference between this embodiment and the embodiment shown in FIG. 2 is that the oblique surface of the oblique structure 122 may further have at least one groove 126 that is recessed into the gap 132 of the optical reflective surface 130. In other words, the groove 126 corresponds to the gap 132 in position. The material of the optical reflective surface 130 may be formed on the surface of the groove 126, or may be not formed on the surface of the groove 126. The groove 126 may be used in the oblique structure 122 shown in FIGS. 2 to 5B.

Figure 10:
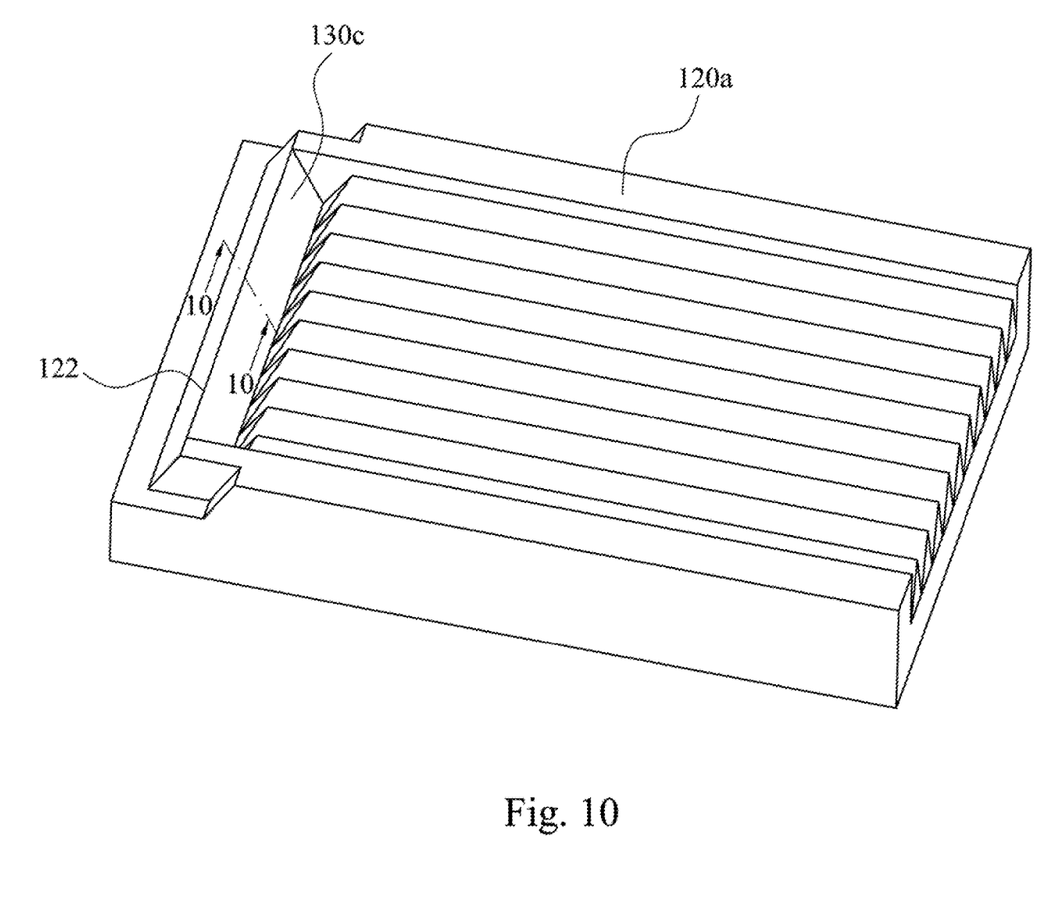
FIG. 10 is a perspective view of a cover according to one embodiment of the present invention.
Figure 11:
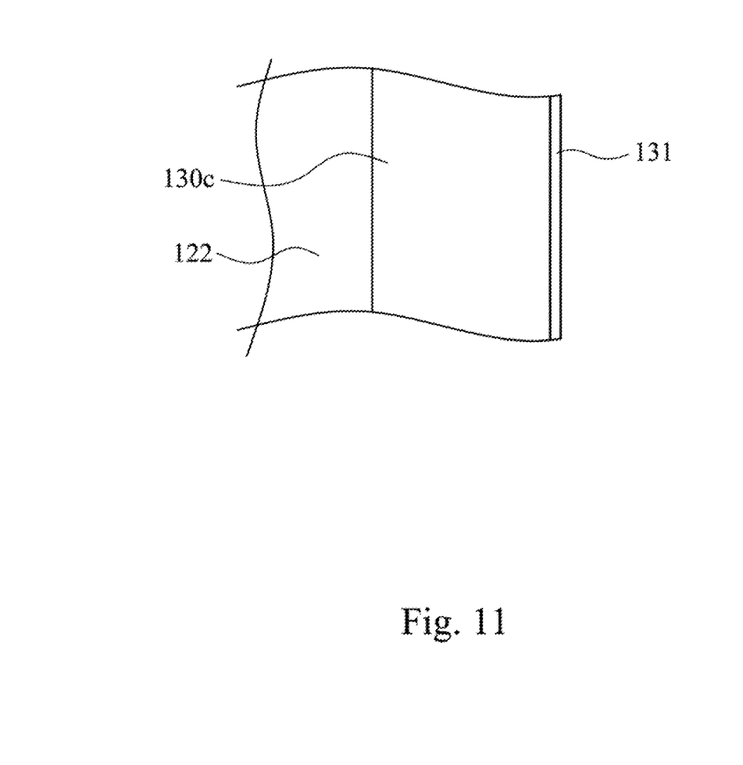
FIG. 11 is a cross-sectional view of the cover taken along line 10-10 shown in FIG. 10.

FIG. 10 is a perspective view of a cover 120a according to one embodiment of the present invention. FIG. 11 is a cross-sectional view of the cover 120a taken along line 10-10 shown in FIG. 10. As shown in FIG. 10 and FIG. 11, an optical reflective surface 130c is formed on the oblique surface of the oblique structure 122, and a noise-absorbing film 131 is formed on the optical reflective surface 130c. The difference between this embodiment and the embodiment shown in FIG. 2 is that the optical reflective surface 130c has no gap 132 shown in FIG. 2, but the optical reflective surface 130c is covered by the noise-absorbing film 131. In addition, the noise-absorbing film 131 may be made of a material including light-permeable nonmetal.

When the noise-absorbing film 131 and the optical reflective surface 130c that has no gap 132 are used in the optical connector 100 shown in FIGS. 3A and 3B, the orthogonal projection of the noise-absorbing film 131 on the substrate 110 overlaps at least a portion of the orthogonal projection of the light source 150 on the substrate 110, and overlaps at least a portion of the orthogonal projection of the photo detector 160 on the substrate 110. As a result of such a design, when the light source 150 emits light, the noise-absorbing film 131 can not only absorb the noise of the light source 150 optically coupled to the optical reflective surface 130c but also absorb the noise of the optical reflective surface 130c optically coupled to the photo detector 160. Hence, the optical connector 100 is capable of having low electromagnetic crosstalk and low noise interference. In this embodiment, the optical reflective surface 130c may be a film that is made of a material including metal and is formed on the oblique surface of the oblique structure 122. The film made of the material including metal is between the noise-absorbing film 131 and the oblique surface of the oblique structure 122. The film may be a metal alloy layer, a multi-layer structure, or a non-conductive sheet that has plural conductive particles distributed therein. In another embodiment, the oblique structure 122 may be made of a material including metal, such that the oblique surface of the oblique structure 122 may be may be directly used as the optical reflective surface without forming additional film that is made of a material including metal.

Figure 12:
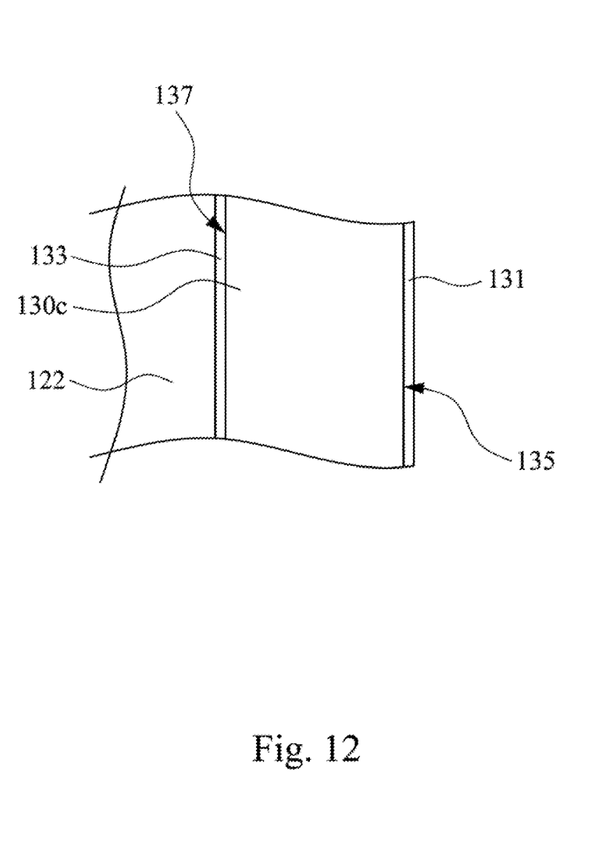
FIG. 12 is another example of the cover shown in FIG. 11.

FIG. 12 is another example of the cover 120a shown in FIG. 11. The optical reflective surface 130c is a film that is made of a material including metal and is formed on the oblique surface of the oblique structure 122. The difference between this embodiment and the embodiment shown in FIG. 11 is that two noise-absorbing films 131, 133 are respectively located on two opposite surfaces 135, 137 of the film that is made of the material including metal. The noise-absorbing film 133 is between the oblique surface of the oblique structure 122 and the surface 137 of the film that is made of the material including metal.

When the noise-absorbing films 131, 133 and the optical reflective surface 130c that has no gap 132 are used in the optical connector 100 shown in FIGS. 3A and 3B, the orthogonal projections of the noise-absorbing films 131, 133 on the substrate 110 overlap at least a portion of the orthogonal projection of the light source 150 on the substrate 110, and overlap at least a portion of the orthogonal projection of the photo detector 160 on the substrate 110. As a result of such a design, when the light source 150 emits light, the noise-absorbing films 131, 133 can not only absorb the noise of the light source 150 optically coupled to the optical reflective surface 130c but also absorb the noise of the optical reflective surface 130c optically coupled to the photo detector 160. Hence, the optical connector 100 is capable of having low electromagnetic crosstalk and low noise interference.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. An optical connector, comprising:
   a substrate;
   a plurality of optical channels for transmitting optical signals;
   a light source located on the substrate for emitting a first optical signal;
   an oblique structure having an optical reflective surface for reflecting the first optical signal that is emitted by the light source to at least one of the optical channels; and
   a photo detector located on the substrate for receiving a second optical signal that is emitted by at least one of the optical channels;

wherein the optical reflective surface has at least one gap, such that the optical reflective surface is divided into at least two segments by the gap, and the segments are not electrically connected with each other.

2. The optical connector of claim 1, further comprising: a cover, wherein the oblique structure is located on the cover.

3. The optical connector of claim 2, wherein the optical channels are disposed on the cover.

4. The optical connector of claim 1, wherein the optical reflective surface is a film that is made of a material comprising metal and is formed on an oblique surface of the oblique structure.

5. The optical connector of claim 1, wherein the oblique structure is made of a material comprising metal, and the optical reflective surface is an oblique surface of the oblique structure.

6. The optical connector of claim 1, wherein a lengthwise direction of the gap is perpendicular to a lengthwise direction of the optical reflective surface.

7. The optical connector of claim 1, wherein a lengthwise direction of the gap is parallel to a lengthwise direction of the optical reflective surface.

8. The optical connector of claim 1, wherein a width of the gap is greater than or equal to 50 μm.

9. The optical connector of claim 1, wherein the optical reflective surface has a plurality of gaps, and the gaps intersect with each other.

10. The optical connector of claim 1, wherein the optical reflective surface has a plurality of gaps, and the sum of widths of the gaps is greater than or equal to 50 μm.

11. The optical connector of claim 1, wherein an oblique surface of the oblique structure has at least one protruding rib that protrudes from the gap.

12. The optical connector of claim 1, wherein an oblique surface of the oblique structure has at least one groove that is recessed into the gap.

13. The optical connector of claim 1, wherein the optical channels are optical fibers.

14. The optical connector of claim 1, wherein the substrate is made of a material comprising silicon, semiconductor, ceramic, epoxy, or plastic.

15. The optical connector of claim 1, further comprising:
a printed circuit board bearing the substrate; and
a driver located on the printed circuit board and electrically connected to the light source.

16. The optical connector of claim 15, further comprising:
a transimpedance amplifier located on the printed circuit board and electrically connected to the photo detector.

17. The optical connector of claim 1, wherein the light source and the photo detector are located on the same edge of the substrate.

18. The optical connector of claim 1, wherein the light source is a vertical cavity surface emitting laser.

19. The optical connector of claim 1, wherein the optical reflective surface is made of a material comprising gold.

* * * * *